United States Patent
Taguchi et al.

(10) Patent No.: US 6,756,326 B2
(45) Date of Patent: Jun. 29, 2004

(54) CLOTHING MATERIAL WITH FOAMED STRAND WELDED TOGETHER THEREIN

(75) Inventors: Susumu Taguchi, Okayama (JP); Tadashi Takekawa, Okayama (JP); Kouji Sako, Okayama (JP); Takahiro Ueda, Kusugaoka-cho, Nada-ku, Kobe-shi, Hyogo (JP), 4-1-32-506

(73) Assignee: Takahiro Ueda, Hyogo (JP)

( * ) Notice: Subject to any disclaimer, the term of this patent is extended or adjusted under 35 U.S.C. 154(b) by 0 days.

(21) Appl. No.: 10/016,997

(22) Filed: Dec. 14, 2001

(65) Prior Publication Data

US 2002/0119718 A1 Aug. 29, 2002

(30) Foreign Application Priority Data

Dec. 27, 2000 (JP) .......................................... 2000-397727

(51) Int. Cl.[7] .............................. B32B 5/24; B32B 5/26; B32B 5/12; B32B 3/26
(52) U.S. Cl. ........................... 442/56; 442/57; 442/224; 442/225; 442/370; 442/373; 428/107; 428/109; 428/110
(58) Field of Search .............................. 428/304.4, 107, 428/109, 110; 442/30, 35, 36, 55, 57, 221, 224, 225, 315, 370, 373, 56; 156/167, 176, 177, 178

(56) References Cited

U.S. PATENT DOCUMENTS 4,144,371 A * 3/1979 Okie et al. ..................... 442/3

FOREIGN PATENT DOCUMENTS

| JP | 10-202808 | 8/1998 | |
|---|---|---|---|
| JP | 11-005282 | 1/1999 | |
| WO | WO 9603100 A1 * | 2/1996 | ........... A61F/13/04 |

OTHER PUBLICATIONS

JP 11005282A. Toyoda Masuru Jan. 12, 1999 (English Translation).*

* cited by examiner

Primary Examiner—Cheryl A. Juska
Assistant Examiner—Jenna-Leigh Befumo
(74) Attorney, Agent, or Firm—Baker & Daniels

(57) ABSTRACT

In garments with a foamed net used as a clothing material (inter-lining), a clothing material is provided that is lightweight and easy-moving, and has improved warmth retaining property, cushioning property and buoyancy without spoiling the feeling of the garment to the wearer and does not cause cost increases or disadvantages in production. A foamed net in a meshed shape being constituted with a plurality of foamed strands intersected and simultaneously welded together at intersection points is inserted between an outer cloth and a lining cloth. The foamed strands may have a cross section form of elliptical shape with different ratios of height to width and the foamed strands are welded together so that the height direction of the cross section form may be orthogonal or almost orthogonal to the face of the net.

6 Claims, 17 Drawing Sheets

(e)

(f)

(g)

(h)

CLOTHING MATERIAL WITH FOAMED STRAND WELDED TOGETHER THEREIN

BACKGROUND OF THE INVENTION

1. Field of the Invention

The present invention relates to a clothing material in which a foamed net in a meshed shape that is constituted with a plurality of foamed strands intersected and simultaneously welded together at intersection points is inserted between a pair of outer clothing layers.

2. Description of the Prior Art

Textiles in which the above-mentioned foamed net in a meshed shape is contained as a main material (textiles in which a foamed net is sandwiched between outer cloth made of synthetic fibers, such as nylon and Tetron, hemp, cotton etc., and lining cloth and the like) is lightweight, and excels in warmth retaining property. These textiles are commonly used in casual wear, life jackets and vests, sportswear, etc. as is described in JP-A No. 10-202808. Foamed strand made of polyethylene, polystyrene, etc. is configured in a meshed shape, and then this foamed net is welded and combined. Such foamed nets are generally used to cover and protect soft and fragile materials, such as fruits and vegetables, or often used as cushioning materials for partitioning during transportation.

Moreover, what is disclosed in JP-A No. 11-5282 etc. is known as a textile itself made of a foamed net as a main material. In the foamed net in this case, foamed strands having thin filament-like shape are arranged so that they may be mutually parallel at regular intervals, and then strands obtained are piled up to constitute a meshed shape. As a cross section form of the foamed strand, a round shape shown in FIG. 11 (a) and a flat elliptical shape (or oval shape) shown in FIG. 11 (b) are commonly used.

In a foamed net adopted in conventional textiles, foamed strands are configured in a meshed shape and clearance is formed among adjacent foamed strands so that the foamed net may have air layers that create a warmth retaining property and as a result a lightweight net is realized. Then when a more advanced warmth retaining property, cushioning property, and buoyancy are required, some means may be used in which foamed nets inserted into textiles are piled up to form a double layer, or warmth retaining and heat insulating layers with different materials are further added, as is described in the above-mentioned document (JP-A No. 11-5282). For example, when a foamed net is used as a material for a life jacket, in order to acquire specific buoyancy, a plurality of foamed nets are used in laminated form in two or more layers, or a tubular-shaped net, often used for the protection of fruits etc, is used (referred to as "cap" in the case where it is used for fruits).

However, the use of plurality of warmth retention and heat insulating layers, such as foamed net, increases the production process of textiles and materials, which causes an obvious cost rise. As a result, an increase in processing has a simultaneous disadvantage of lengthening the lead-time in production lines. Therefore, many improvements must be made in order to increase the warmth retaining property, cushioning property and further buoyancy function effectively.

In order to improve buoyancy and heat insulating function in the present foamed net, without two or more layers of lamination, as shown in FIG. 11(b), it is proposed that the intersection angle between upper and lower foamed strands s1 and s2 be made larger (or an oblong section form may be adopted) so that a cross section form of welded foamed strands of s1 and s2 at intersection point k may have the shape of a long ellipse-like form with width w.

In this method, a cost rise and increase in weight are caused because the textiles come to have a large number of strands per unit area (or have a large volume per unit length of strand). Moreover, since a wide welded area at intersection point k induces a decrease in flexibility and as a result many disadvantages arise, this method is difficult to be realized.

SUMMARY OF THE INVENTION

An object of the present invention is, in garments With foamed net used as a clothing material (inter-lining), to provide clothing materials that are light-weight and easy-moving and have a high warmth retaining property, high cushioning property and high buoyancy function without spoiling the wearer's feeling in wear, and that do not cause a cost increase or the above-mentioned disadvantages in production.

The invention provides clothing material in which a foamed net in a meshed shape being constituted with a plurality of foamed strands intersected and simultaneously welded together at intersection points is used by being inserted between a pair of outer clothing layers, wherein in the foamed net the foamed strands are welded together so that the foamed strands have cross section forms with different ratios of height dimension to width dimension, and simultaneously the longitudinal direction of the cross section form has an angle of 45 to 90 degrees to a face of the net in a meshed shape.

Foamed strands having cross section forms of elliptical shape, or of Japanese hand drum form, etc. with different ratios of height to width are welded so that a longitudinal direction of the cross section may have an angle of 45to 90 degrees to a face of the net in a meshed shape. Thus, the thickness of the foamed net increases and the amount of the foamed strands per unit volume of the foamed net decreases, as compared with a case where the longitudinal direction of the cross section may be parallel to the face of the net (oblong state) or with a case where the cross section form has a round shape. As a result, a clothing material is obtained that has a large air layer in the net and that has a large amount of elastic deformation in a direction orthogonal or almost orthogonal to the face of the net.

Since a foamed net of the present invention has a welded area equal to a conventional net with a circular cross section of foamed strands, flexibility as a clothing material is not impaired with very little cost increase. Therefore, warmth retaining property (heat insulating nature), buoyancy, flexibility and cushioning property sufficient for textiles are obtained by only one layer, even if foamed nets are not double laminated as was done before. Besides, since a laminating process is not required, excellent productivity and workability may also be maintained.

Furthermore, a cross section form of a foamed strand having the constitution set forth above may be almost elliptical. Moreover, a cross section form of the foamed strand may be configured so that an end of a vertical line of character T may be aligned at the intersection point.

When the cross section form is approximately elliptical, the foamed strand volume per unit length decreases, and a clothing material with better function is obtained. Moreover, in the case where the cross section form has a shape such that an end of a vertical line of the character T may be aligned at the intersection point, a clothing material may be manufactured having a function in which a contact point with an outer cloth layer forms a flat face and impact to the outer cloth is absorbed efficiently.

A ratio of height to width of the foamed strand in the cross section form may be in a range of 1.1 or more and 4.0 or less as is described in detail in preferred embodiments, and the following functions are provided. The foamed strand becomes deformed by compression in a cross section longitudinal direction (in a direction orthogonal or almost orthogonal to the clothing material i.e. the face of the net), without buckling of the foamed strand, when an external force against a body to be protected and covered by clothing material is applied to the clothing material, i.e., the foamed net. Consequently, a clothing material may be obtained in which an outstanding cushioning property, based on the cross section form with larger height than width of the foamed strand, is effectively achieved.

DETAILED DESCRIPTION OF THE INVENTION

Figure 14:
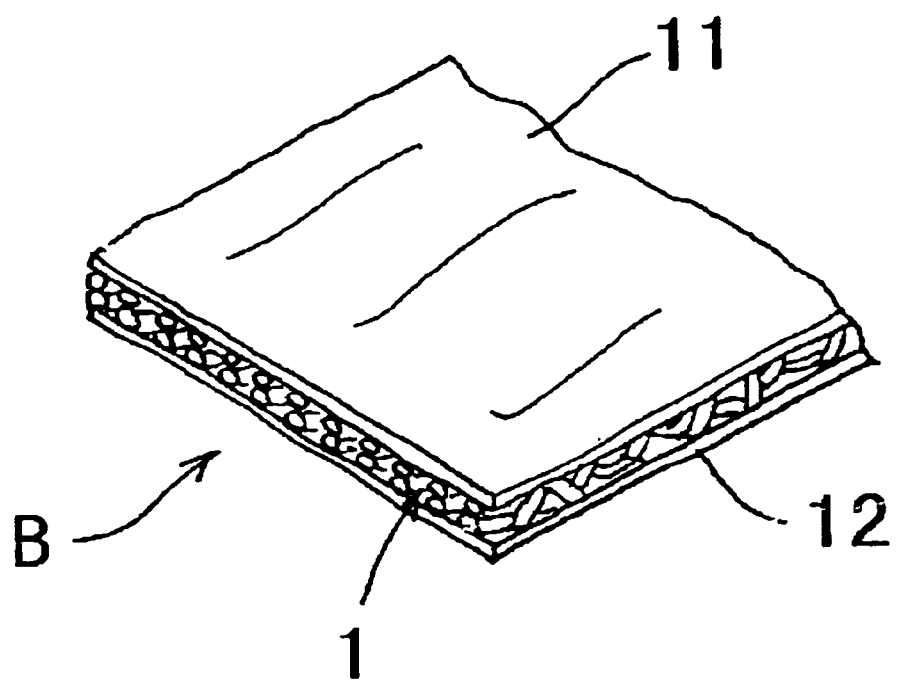
FIG. 14 is a perspective view showing a textile according to the present invention.
Figure 15:
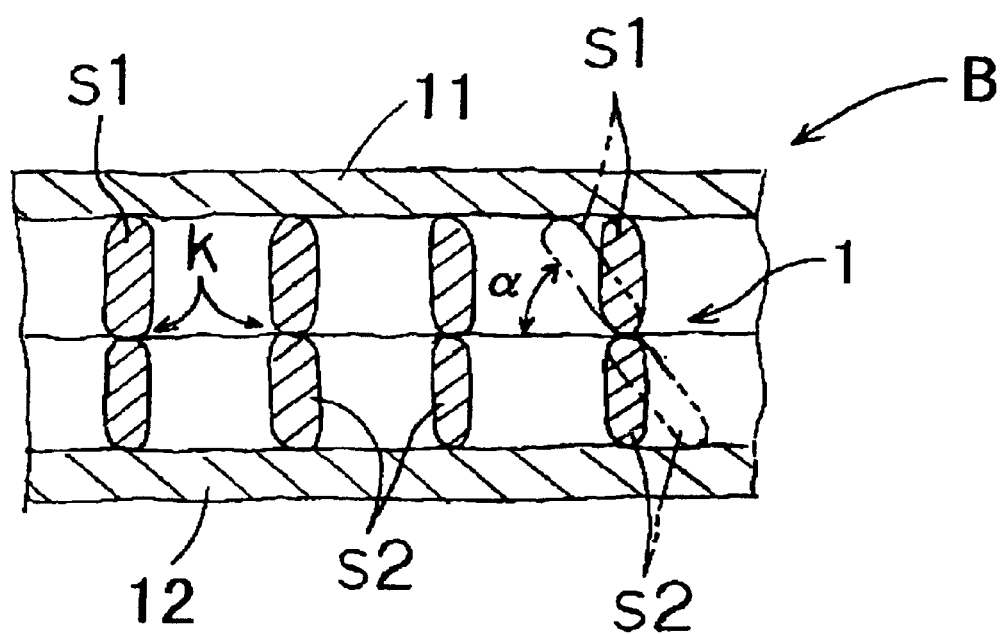
FIG. 15 is a sectional view showing the constitution of the textile shown in FIG. 14.

Textile B that is an example of a clothing material according to the present invention is shown in FIG. 14, and the sectional view is shown in FIG. 15. Textile B has a three-layer structure in which a foamed net 1 is inserted as the main material between outer materials (for example outer cloth) 11, and lining cloth (for example outer cloth) 12. The outer material 11 and the lining cloth 12 are made of synthetic fibers (nylon, Tetoron, etc.) and natural fibers, such as hemp, cotton, and olefinic foamed sheet and nonwoven fabric, etc. The outer material 11, foamed net 1, and lining cloth 12 are combined with various adhesives.

Figure 16:
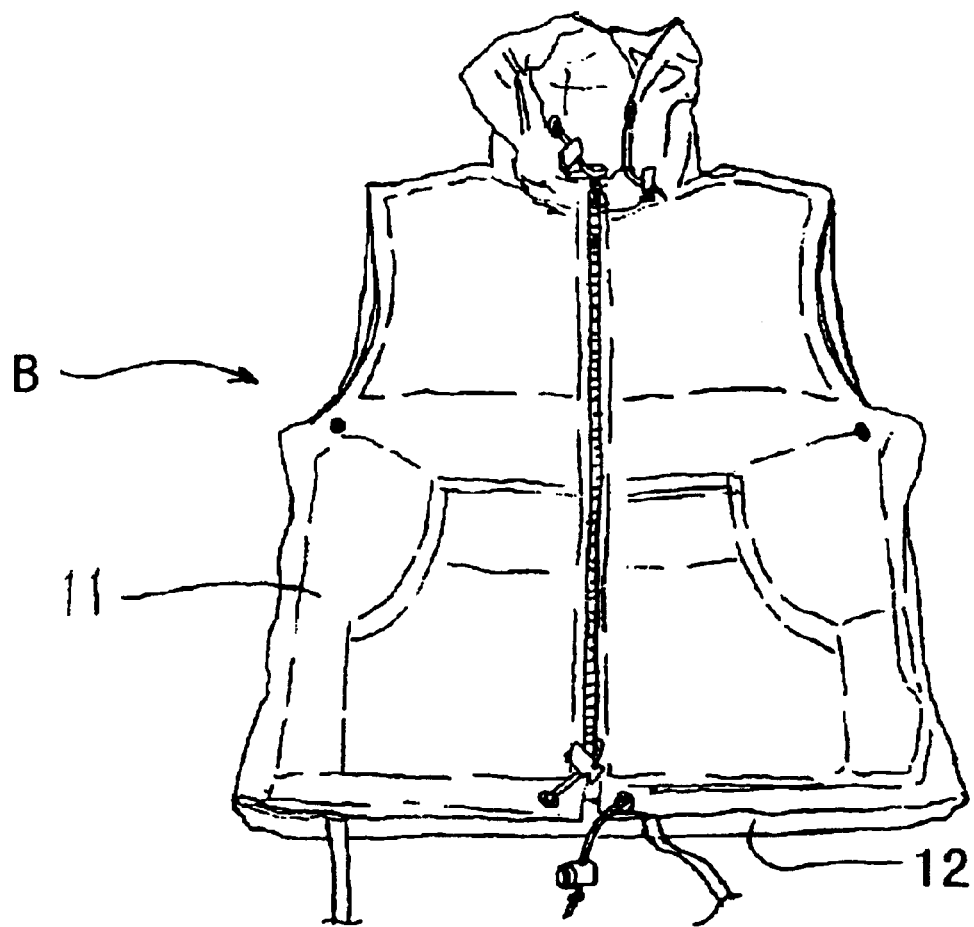
FIG. 16 is a plan view of a vest.
Figure 17:
FIG. 17 is a plan view of a jacket.

In textile B, a construction in which a foamed net 1 is inserted into a sheet processed into the shape of a bag with outer clothing layers 11 and 12 made from the above-mentioned various materials of nylon etc., and a construction in which textiles with a structure of each of these are processed by quilting processing may be used. Examples of clothes using these textiles B, are sportswear, casual wear, life jackets (life vests), and others. As examples for reference of the products using the textiles B in the present invention, a vest is shown in FIG. 16 and a jacket is shown in FIG. 17.

In addition, either an open cell or a closed cell may be used as the cell in a foamed material that constitutes foamed strands s1 and s2 in case of a casual wear, and a closed cell is suitable in the case of a life jacket because it requires buoyancy.

Figure 1:
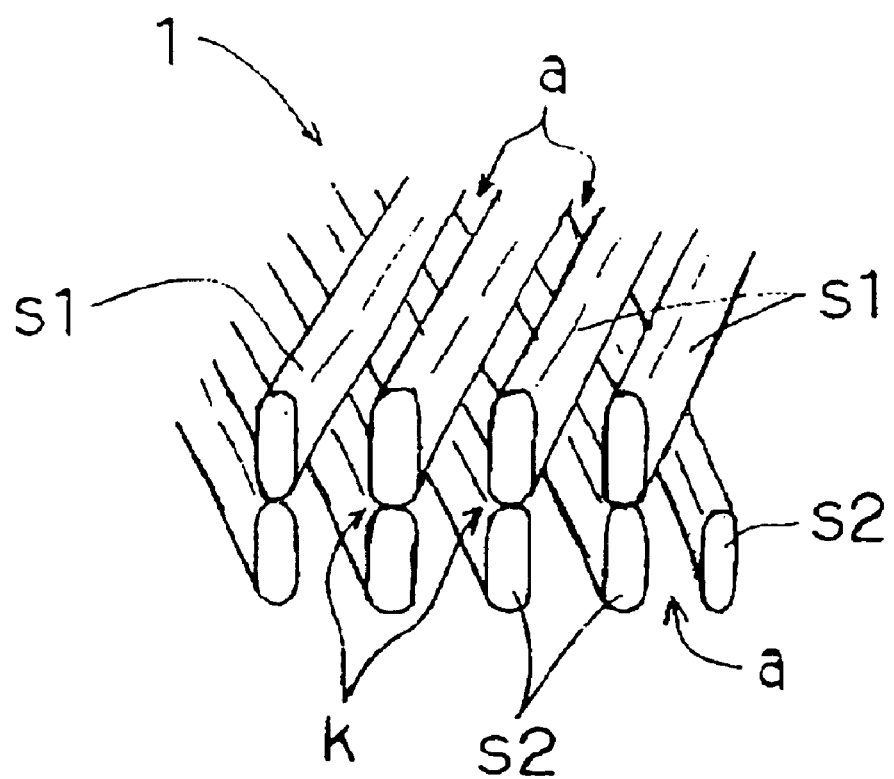
FIG. 1 is a plan view showing a foamed net.
Figure 2:
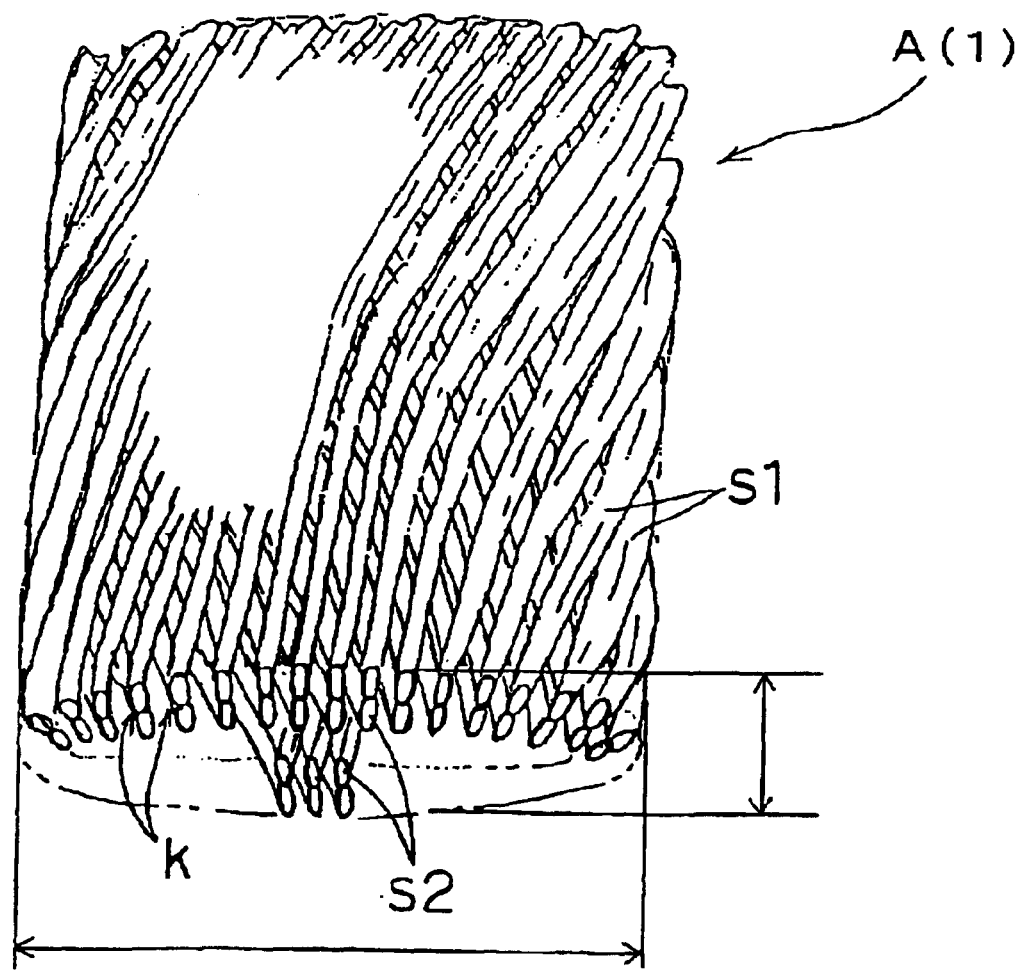
FIG. 2 is a plan view showing a cap for fruit.
Figure 12:
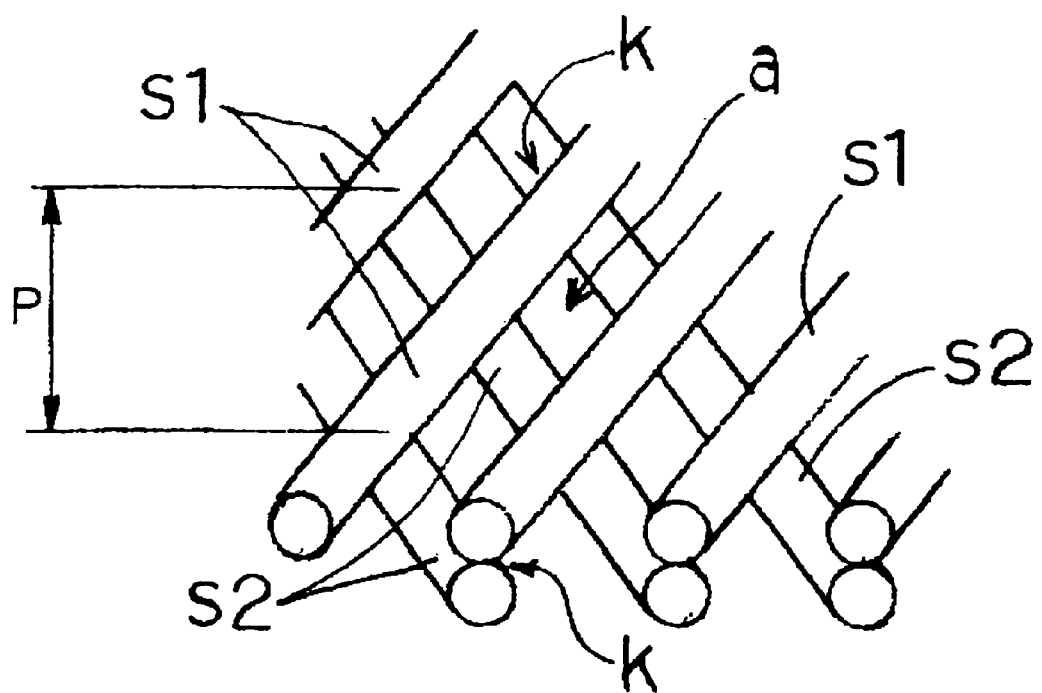
FIG. 12 is a perspective view partially in section showing a conventional foamed net.

Next, a foamed net 1 used for a textiles B as the main material will be explained in detail. A foamed net 1 is shown in FIG. 1, and a cap A for wrapping and protecting fruits etc. is shown in FIG. 2. A foamed net 1 has a structure of meshed shape in which a plurality of foamed strands s1 and s2 are mutually intersected, and the foamed strands s1 and s2 overlapped at intersection points k are welded together. When a foamed net 1 is connected in a loop to a cylindrical shape, a cap A is obtained. In some caps A for wrapping and protecting fruit etc. as an example, an arranged pitch (refer to P of FIG. 12) of strands in the bottom of the cap A is set narrower than an arranged pitch in the upper, lower, and middle parts of the net so that spreading caused by elastic deformation may not occur and that fruits etc. inside may not fall out from the bottom of the cap A.

Figure 3:
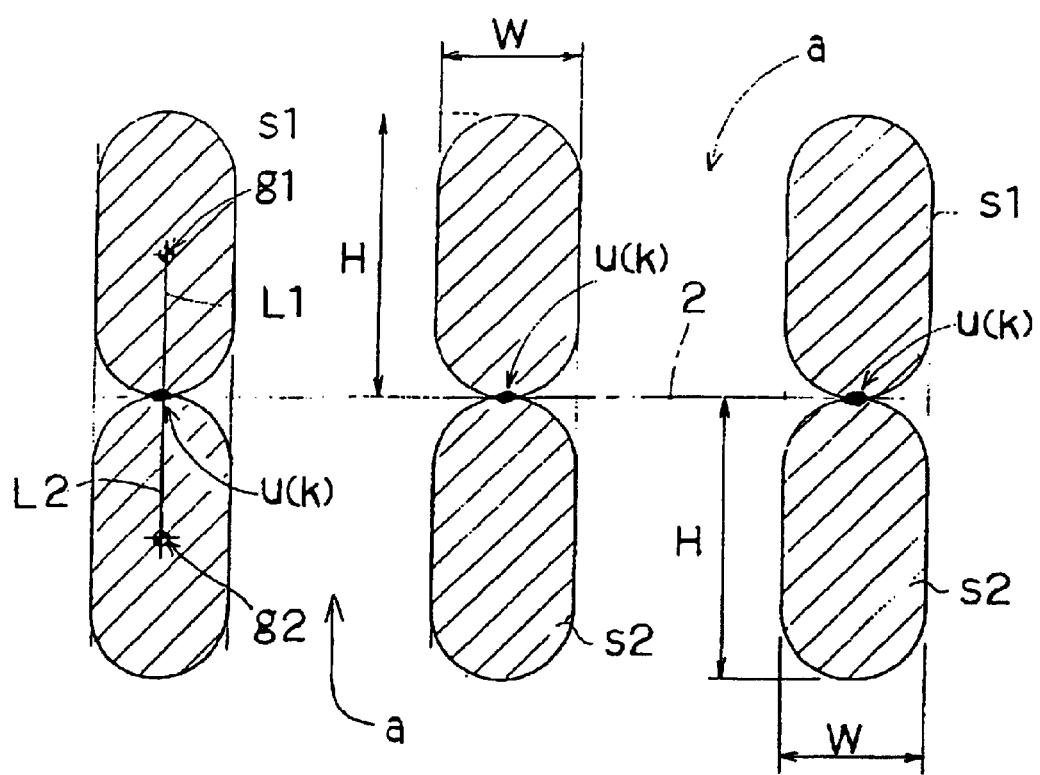
FIG. 3 is a sectional view of a foamed net showing a cross section form of a foamed strand.

As shown in FIG. 2 and FIG. 3, both the first foamed strand s1 and the second foamed strand s2 are elliptical, and have the same cross section form and size mutually, and each cross section form of foamed strands s1 and s2 has a different ratio S of height to width, and at the same time the first and the second foamed strands s1 and s2 are mutually welded so that a longitudinal direction of the cross section form orthogonally intersects a face 2 of the meshed shape net. In the case of a cross section of elliptical shape, both of the first and the second line segment L1 and L2 that connect a welded section (welded point) u in an intersection point k and centroids g1 and g2 of a sectional views of each of the foamed strands s1 and s2 respectively are orthogonally configured to intersect to a face 2 of the meshed shape net.

In addition, foamed strands s1 and s2 may be welded so that a longitudinal direction of the cross section form may have an inclined state (refer to dashed line of FIG. 15) of from 45 to less than 90 degrees to the face 2 of a net in a meshed shape. In this case, the first and second line segments L1 and L2 have an inclination corresponding to the angle of inclination.

A face 2 of the net represents a virtual plane made by foamed net 1 put in a flat state and also represents a plane corresponding to a bottom plane of a flat plate put on the net 1. Moreover, when cap A is used for an object to be protected of the shape of a cylinder, such as a wineglass, its cylindrical face is equivalent to the face 2 of a net. And "a" is a gap between adjacent strands and at the same time is an air layer (with gas permeability) to provide buoyancy. In FIG. 3, a strand currently drawn on the upper position of the drawing is the first foamed strand s1 in a side that touches outer material 11, and a strand currently drawn on the lower position is the second foamed strand s2 in a side that touches lining cloth 12 (FIG. 15). In case of a cap A, the outside strand is the first foamed strand s1, and the inside strand is the second foamed strand s2.

When a ratio S is defined as a ratio of height to width, H as height and W as width, in a cross section form of foamed strands s1 and s2, then S=H/W. In order to provide excellent buoyancy, cushioning property, warmth retaining property, etc., S is preferably 1<S<5 (W<H<5W). Moreover, S is preferably set in a range of 1.1<S<4.0 (1.1 W<H<4.0 W) so that foamed strands s1 and s2 are not buckled even if a force in a direction orthogonal or almost orthogonal to the face 2 of the net is applied.

The reason is that when S is 1.1 or less excellent buoyancy, cushioning property and warmth retaining property are difficult to obtain, and when S is 4.0 or more the foamed strands can possibly buckle. By setting S in a suitable range, deformation by compression is carried out in a longitudinal direction of the cross section without buckling of foamed strands s1 and s2, and as a result a textile B that also has an effective cushioning property may be obtained. In addition, a more preferable value for acquiring effective buoyancy without buckling etc. is 1.5<S<2.5 (1.5 W<H<2.5 W).

Thus, by using foamed strands s1 and s2 with a long cross section in the direction of height, there is provided an advantage that warmth retaining property, buoyancy and cushioning property at a level obtained by a conventional double cap may be obtained by a single cap. In this case, when foamed strands s1 and s2 with a conventional circular cross section shown in FIG. 11(*a*) are compared with the foamed strands s1 and s2 of the present invention with elliptical cross section shown in FIG. 3 on condition that both have the same buoyancy, cushioning property and warmth retaining property, the strands of the present invention require a smaller cross-sectional area, and as a result a lightweight property is attained.

Moreover, an improved cushioning property is naturally obtained in a foamed net 1 in which foamed strands s1 and s2 having a cross section form set in a ratio of height to width with larger height than width. However, since the contact area with an outer material 11 or lining cloth 12 is comparatively smaller than expected, the strand has a small contact frictional resistance enabling it to be handled easily in production and also to increase its workability.

Figure 4:
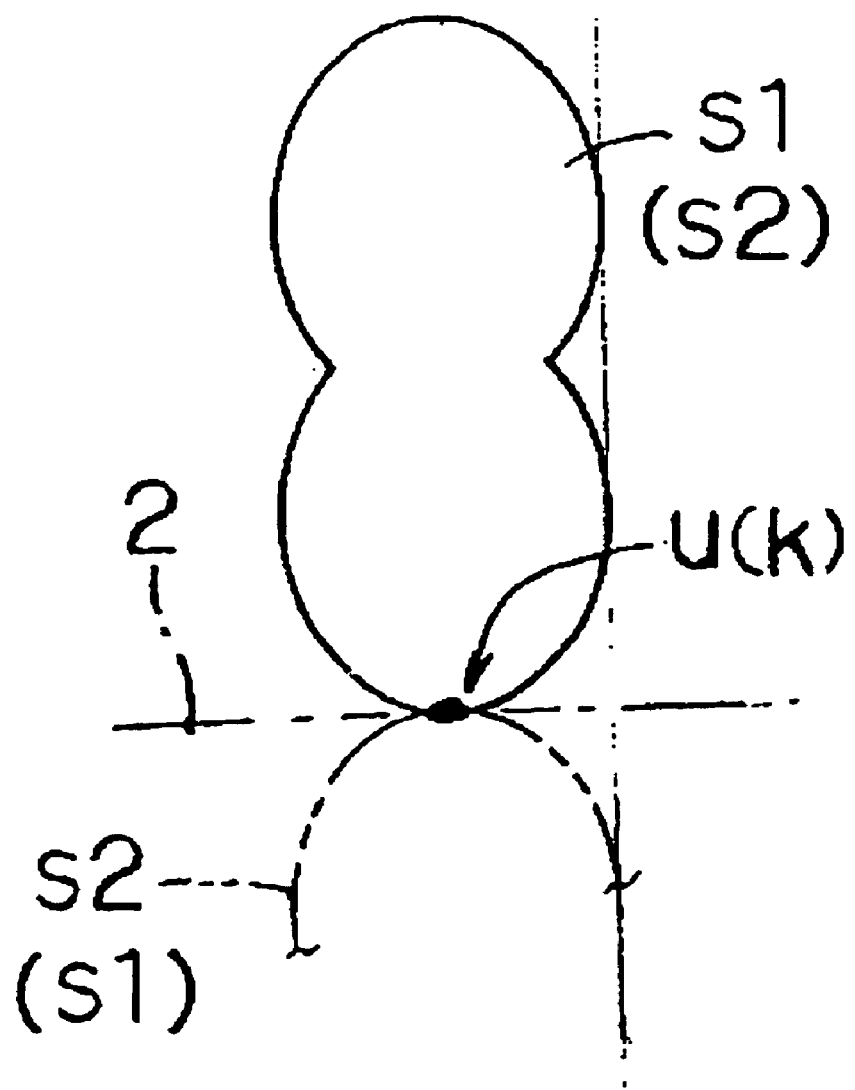
FIG. 4 is a sectional view of a foamed net showing another example of a cross section form of a foamed strand.
Figure 5:
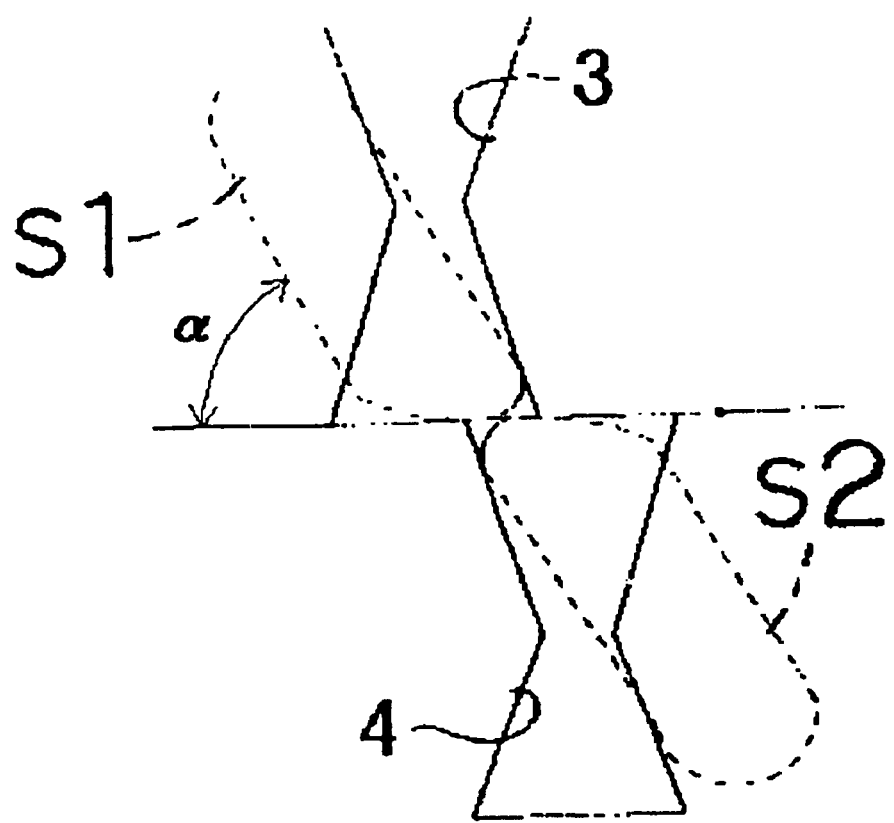
FIG. 5 is a view showing a form of a nozzle for molding a foamed strand as shown in FIG. 3.
Figure 8:
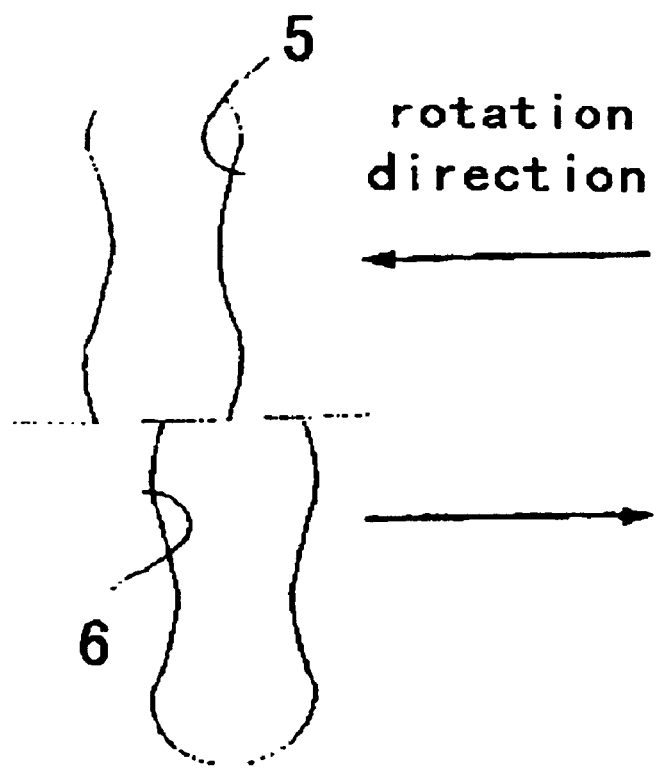
FIG. 8 is a view showing a form of a nozzle for molding a foamed strand as shown in FIG. 4.

In order to prepare foamed strands s1 and s2 that have the cross section form of elliptical shape shown in FIG. 3, it is preferable to perform the foaming using out and in nozzles 3 and 4 that have a form shown in FIG. 5 (nozzles 3 and 4 have the same shape). In order to prepare foamed strands s1 and s2 that have Japanese hand drum type (gourd form) of cross section form shown in FIG. 4, it is preferable to perform foaming using out and in nozzles 5, 6 with a form similar to the gourd form shown in FIG. 8. Moreover, as long as foamed strands s1 and s2 with the cross section form shown in FIG. 3 or FIG. 4 are obtained nozzles with any form may be used.

Figure 6:
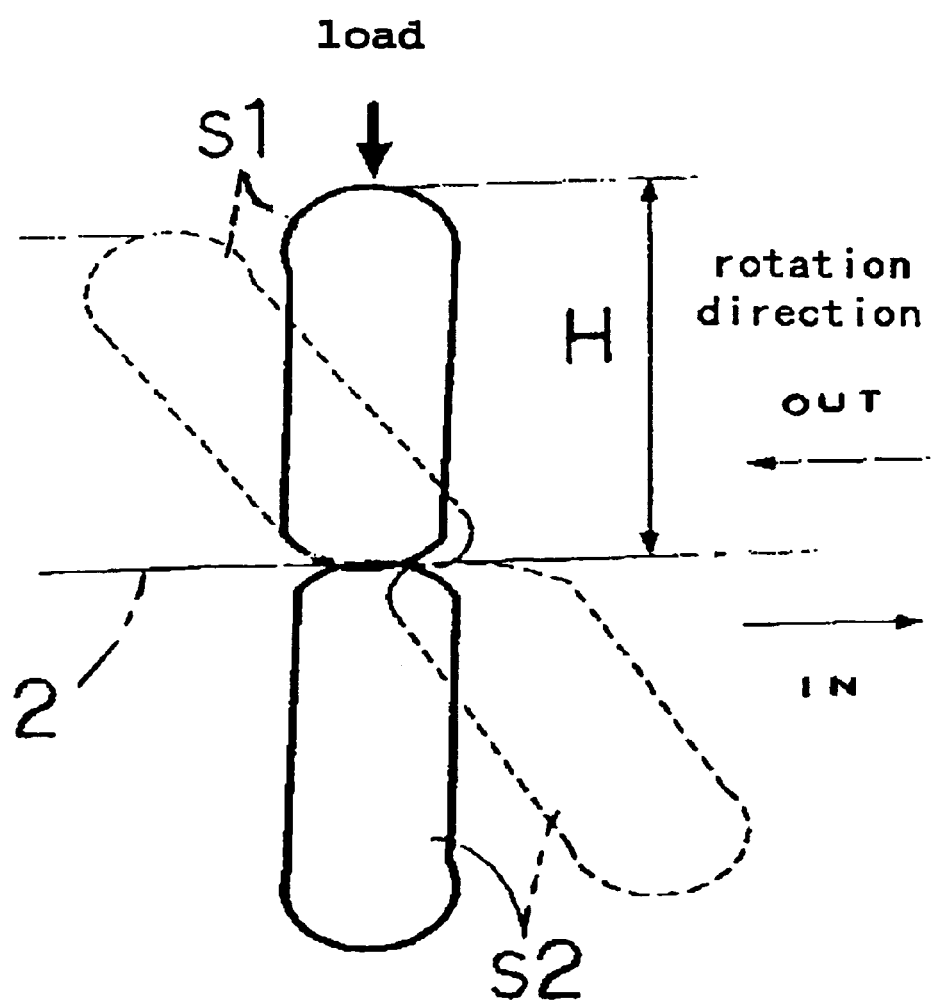
FIG. 6 is a view showing an undesirable situation when using the nozzle of FIG. 5.

By rotating nozzles 3 and 4 with the form shown in FIG. 5, foamed strands s1 and s2 with a shape of almost elliptical shape inclined in the rotation direction, as shown by the dashed lines in FIG. 6, are obtained. The description above shows that an improvement of the nozzle is required in order to set a degree a of an angle of inclination of foamed strands s1 and s2 to the face of net 2 into 45 to 90 degrees.

Figure 7:
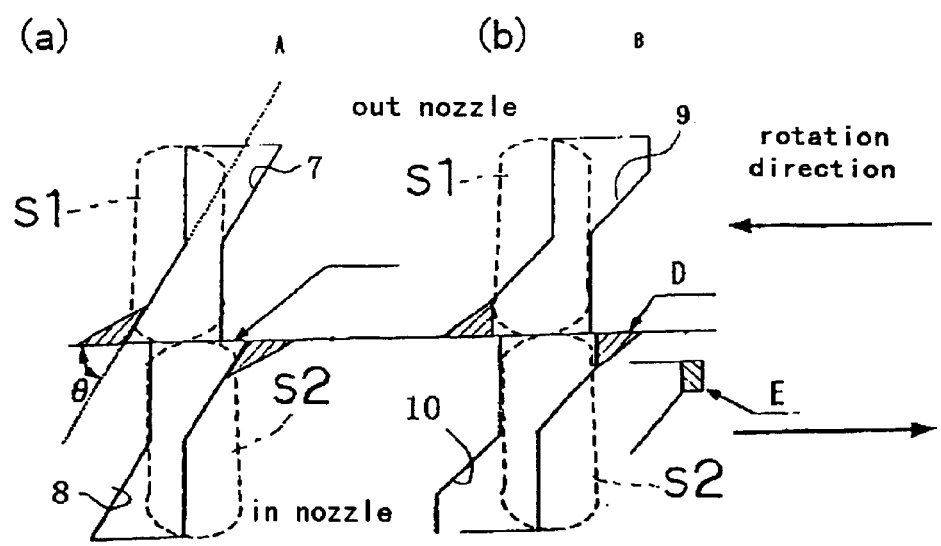
FIG. 7 is a sectional view showing a form of a nozzle providing the cross section form of FIG. 3.

Namely, when rotation is made to work using nozzles 3 and 4 shown in FIG. 5, it is necessary that adjustment is made so that the degree a of the angle of inclination to the face 2 of the net of foamed strands s1 and s2 may be in a range of 45 to 90 degrees. For this purpose, out and in nozzles 7 and 8 with a form as shown in FIG. 7(*a*) and out and in nozzles 9 and 10 with a form as shown in FIG. 7(*b*) are used. It is possible to maintain the degree a of the angle of inclination of foamed strands s1 and s2 in the range of 45 to 90 degrees, by changing an angle θ of the nozzles in FIG. 7. Rotation of nozzles 7, 8, 9, and 10 gives a product in which across section (almost elliptical cross section) with almost oval form is orthogonal to the face 2 of the net, as the dashed lines in FIG. 7 show, and as a result, a high cushioning property is demonstrated. Moreover, there is a tendency for the cushioning property to be remarkably decreased if the degree a of the angle of inclination is less than 45 degrees.

The inclination may be cancelled by the reduction of a value of a reverse angle .θ, although an increase in rotation velocity of nozzles 7 and 8 enlarges the inclination of the strands. However, since the out nozzle 7 and in nozzle 8 rotate in a different direction mutually, a decrease in adhesion strength of welded part u may be sometimes induced based on the form of the product and on the time of contacting between the out nozzle 7 and the in nozzle 8 and on the type of raw materials, etc. Especially adhesion strength in the side of the rotation direction of the nozzles 7 and 8 may be decreased.

Contact portions between the out nozzle 7 and 9 and the in nozzle 8 and 10 in the side of the rotation direction of the nozzles 7, 8, 9 and 10 are lengthened and expanded (portions shown in FIG. 7 with slashes), as is represented by D in FIG. 7, so that an improvement in adhesive strength is obtained. In addition, a form like a rectangle or trapezoid of the contact portion E may be adopted as the form of the contact portion D. It is preferable that a resin with large MFR, such as EVA, elastomer, metacelon resin, etc. is added as a raw material to improve adhesive property.

Either closed or open cells are acceptable as air cells that constitute foamed strands s1 and s1 and s2. As a material for foamed strands s1 and s2, PVC, poly-olefinic resins, such as polyethylene and polypropylene, polystyrene derived resin, polyvinyl chloride derived resin, EVA, thermoplastic elastomer (TPE), metacelon resin, etc. are suitable. For example, polyethylene and polypropylene are preferable.

Two or more kinds of resins may be mixed and used together. Moreover, in order to obtain improvement in processing when discarded, foamed strands of biodegradable resins, such as polylactic acid, starch synthetic macromolecule blended polymer, aliphatic polyester, polycaprolactone, cellulose, and PVA, and mixtures of these resins may also be used. As cellular regulators, talc, inorganic foaming agent, and organic foaming agent are mentioned. As additives, antibacteria medicine, fungicide, adsorbent, deodorant, antistatic agent, shrinkage inhibitor, antioxidant, UV absorbent, far-infrared generating substance, etc. are mentioned As an adsorbent and a deodorant, an inorganic substance, such as zeolite and tourmaline, and ceramics, are suitable.

Foamed strands s1 and s2 are prepared using the above-mentioned components foamed with a foaming agent. General manufacturing methods for foamed strand may be used for manufacturing the foamed strand of the present invention. For example, a method may be employed in which a foaming agent is mixed with a resin composition constituting the foamed strand and the mixture is then foamed. As the formation method, the extrusion molding method is preferably used.

Foaming agents used for the above-mentioned foaming object, may include for example: inorganic foaming agents, such as carbon dioxide, nitrogen gas, and water; organic foaming agents, such as hydrocarbons including pentane, isopentane, and butane, and chlorinated hydrocarbons, such as alternatives for chlorofluorocarbon, methylene chloride, and methyl chloride. Moreover, as chemically reactive type foaming agents, for example, sodium hydrogencarbonate, mixtures of inorganic substances, such as sodium hydrogencarbonate and acid, azo compounds, nitroso compounds, triazole compounds, etc. may be used. These foaming agents may be used independently or two or more may be used together. When foaming agents of high foaming magnification are required, it is preferable to use hydrocarbons, such as pentane, butane, carbon dioxide, nitrogen gas, and water, etc.

The amount of combination of a foaming agent used in manufacturing a foamed strand is not especially limited, but is suitably set according to a the type of foaming agent to be used or to a desired foaming magnification, etc. Although a foaming magnification of the foamed strand is not limited, it is preferably 5 to 100 times and more preferably 20 to 70 times. A small foaming magnification causes a decrease in elasticity, and an excessive foaming magnification tends to induce a decrease in strength. In the above-mentioned foamed object, additionally, inorganic substances, such as talc, calcium carbonate, aluminum hydroxide, and boric acid, may be used as a cellular regulator. The amount of the above-mentioned cellular regulator used is not especially limited.

In molding of foamed strands s1 and s2 by the present invention, molding conditions, such as extrusion conditions, are not especially limited, and the combination method of each component is not limited either. Each component is simultaneously or in consecutive order blended and is mixed accompanied by heating at the time of molding. As a mixing method, a general stirring system may be used. After mixing each component together and molding into desired form, such as the shape of a pellet, a foaming process may be carried out.

As a manufacturing method of foamed strands s1 and s2, a tandem extruding machine in which two sets of extruding machines are combined in series is used. The thermoplastic resin and a cellular regulator are supplied to the first extruding machine and a foaming agent is injected in from a middle path of the first extruding machine to obtain a foaming molten mixture. The molten mixture is cooled in the second extruding machine to a suitable temperature for the formation of air bubbles, and subsequently this molten mixture is extruded under atmospheric pressure from nozzles attached at the tip of the extruding machine to obtain foamed strands.

Out nozzle 9 and in nozzle 10 of FIG. 7(b) are attached in a nozzle, and manufacturing of strands is performed. A form of nozzles is not especially limited. That is, in nozzle 4 and out nozzle 3 in the tip of a rotating dice are rotated in different directions mutually, and a foamed net in a meshed shape is obtained. After a net talking-up machine takes up the foamed net 1, net 1 is cut into specified size. Moreover, it is also possible to produce strands slits at the time of extrusion, to obtain a specified size after being taken up by a taking up belt followed with a cutting process.

Other Embodiments

As a pair of outer clothes constituting surface material of textile B, a pair of outer materials 11 and 11 or a pair of cloths 12 and 12 may be used, other than a pair of outer materials 11 mentioned above and lining cloth 12. And moreover a constitution in which one interior material layer or two or more are laminated in the foamed net 1 side of the outer material 11 or lining cloth 12 may also be used, and various modifications are possible for thickness, number, quality of the material, kind, etc. When a high waterproof property is required, waterproofing treatment is preferably given by applying synthetic resin onto the outer material 11 and lining cloth 12. In addition, bags, such as rucksack, footwear, pole case, etc. types are mentioned as goods utilizing buoyancy of clothing material B.

For a foamed net 1 contained in textile B, the following (1) to (8) are mentioned as examples of other cross section forms of foamed strands s1 and s2.

(1) As shown in FIG. 9(a), the shape of character T and of inversed character T wherein a leg of the T is welded to the T of the other array.

(2) As shown in FIG. 9(b), the shape of character L and of inversed character L.

(3) As shown in FIG. 9(c), the cross section form of the first foamed strand s1 is the shape of character T, and the cross section form of the second foamed strand s2 is the shape of a straight line (a shape of the character I).

(4) As shown in FIG. 9(d), the cross section form of the first foamed strand s1 is the shape of character L, and the cross section form of the second foamed strand s2 is the shape of a straight line (a shape of the character I).

(5) As shown in FIG. 10(e), the shape of the character V and of the inversed character V.

(6) As shown in FIG. 10(f), the shape of the character U and of the inversed character U.

(7) As shown in FIG. 10(g), the shape of the character Y and of the inversed character Y.

(8) As shown in FIG. 10(h), the cross section form of the first foamed strand s1 is the shape of an ellipse with larger height than width, and the cross section form of the second foamed strand s2 is the shape of an ellipse with larger width than height.

Figure 9:
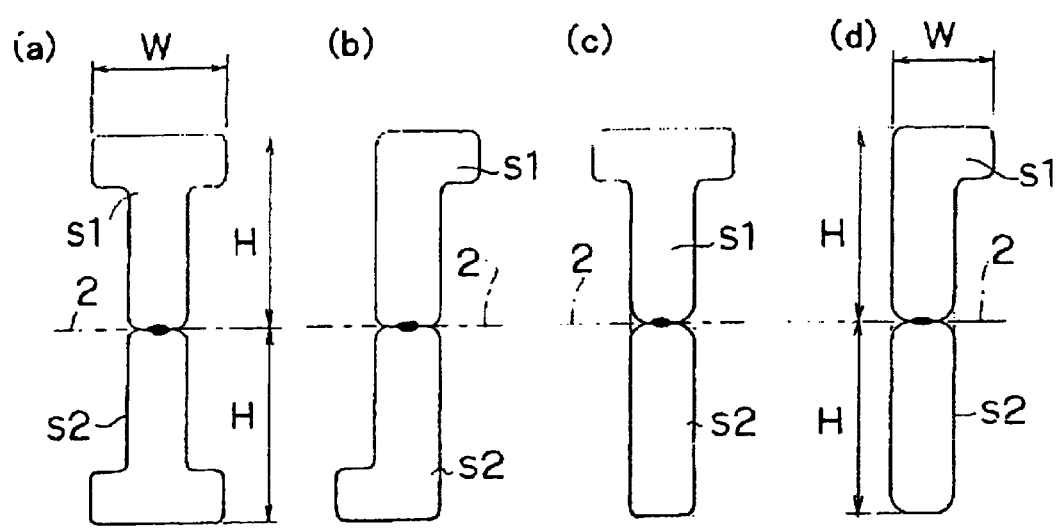
FIG. 9 is a sectional view showing other forms of foamed strand cross section.
Figure 10:
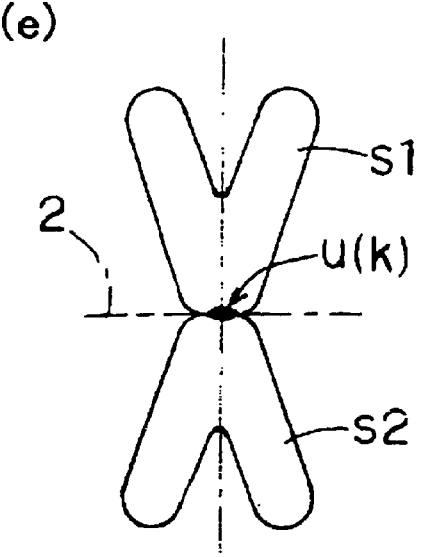
FIG. 10 is a sectional view showing other forms of foamed strand cross section.
Figure 10:
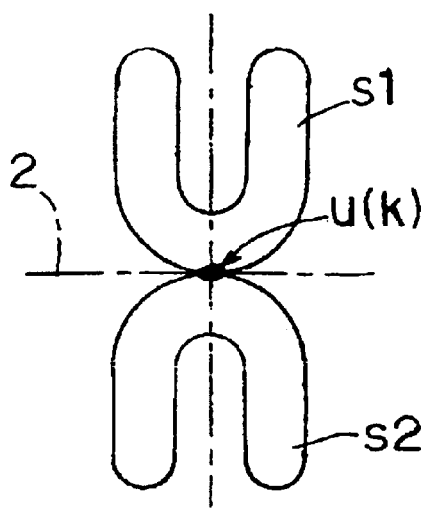
Figure 10:
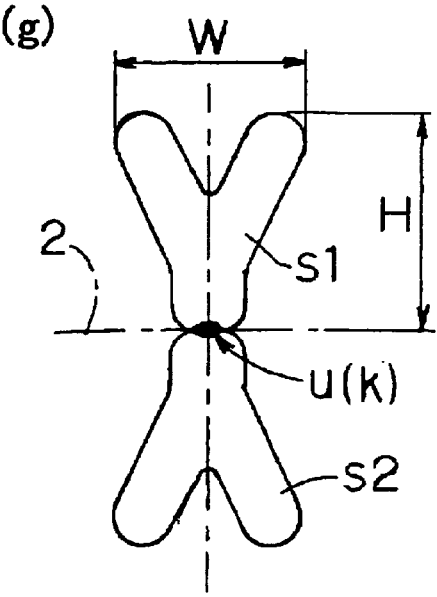
Figure 10:
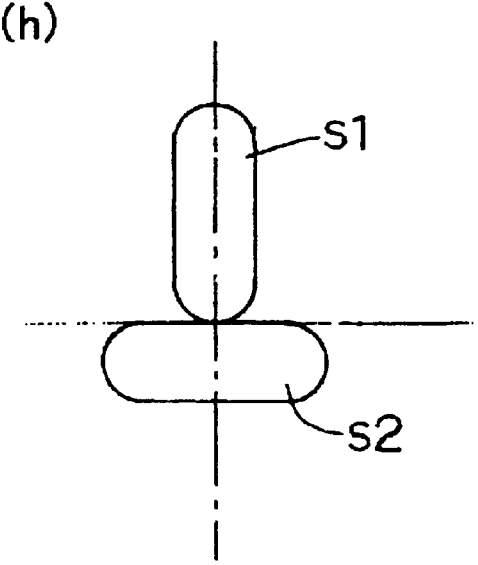

Also in all of these foamed strands s1 and s2 with a cross section form shown in FIG. 9 or FIG. 10, a ratio S of height to width of those cross sections is set as 1<S (W<H), namely the height H is larger than the width W. Moreover, as shown in FIG. 10(h), only one strand of a pair of foamed strands s1 and s2 may have a larger height than width.

When a foamed net 1 used for clothing material (textile) B of the present invention is in contact with another object and an external force orthogonal or almost orthogonal to a face 2 of a net is applied, the net is configured and constituted so that compression deformation of the foamed strands s1 and s2 may be carried out in the longitudinal direction as a cross section form. That is, deformation is performed equally in right and left directions, without deformation in the transverse direction of the cross section form, when the compression direction load is applied. The form shown in FIG. 9(d) may also be used that has a flat upper surface and can be deformed in orthogonal or almost orthogonal direction to a face 2 of the net without being turned over. Besides a bilaterally symmetrical form, such as the elliptical form shown in FIG. 1, Japanese hand drum form shown in FIG. 4, and character T form shown in FIG. 9 can be employed. All constructions that have a shape of the character V, character U, or character Y shown in FIG. 10 and constructions shown in FIG. 9 mentioned above that have a cross section form having a larger height H than a width W are defined as "construction in which a longitudinal direction of the cross section form is orthogonal or almost orthogonal to a face of the net in a shape of mesh".

EXAMPLE 1

(1) Molding machine: 40 to 50 mm tandem extruder (2) Material: polyethylene (product by TOSOH Corporation, MFR 24) 100 weight parts (3) Cellular regulator: (Eiwa Chemicals, EE205) 1.0 weight parts (4) Foaming gas: butane (5) Nozzle: Form of FIG. 7(*b*) (a form from which the product of FIG. 3 is obtained) 250 H (the number of strands) A foamed net with closed cell and with 1m of width was obtained using the above-mentioned apparatus and materials of (1) to (5). In addition, the cross section form of the foamed strand is shown in FIG. 3, the whole form is shown in FIG. 2, and the size etc. is shown in Table 1.

Comparative Example 1

Figure 11:
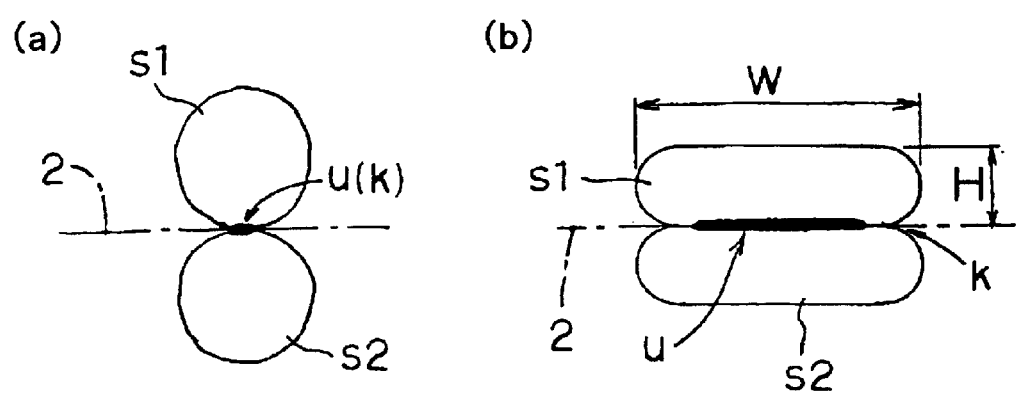
FIG. 11 is a sectional view showing a cross section form of a conventional foamed net.
Figure 13:
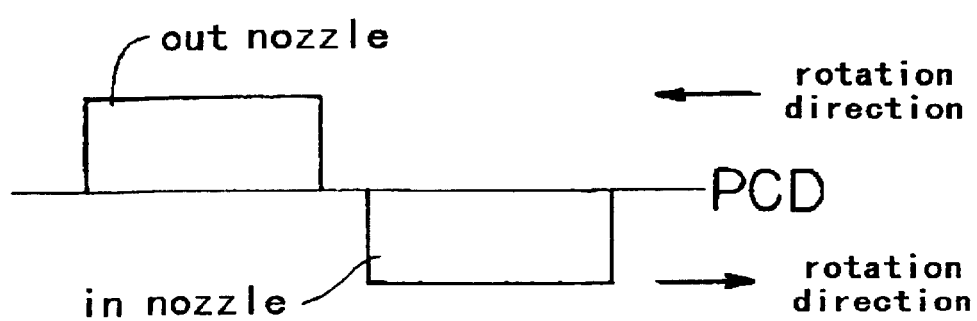
FIG. 13 is a sectional view showing a form of a conventional nozzle.

The same method as Example 1 was followed except that the nozzle of FIG. 13 [a nozzle that produces the form of FIG. 11(*a*)] and 250 H (the number of strands) was used to obtain a net with a closed cell and with 1 m of width.

TABLE 1

| | Foamed strand size | | Foaming magnification | Buoyancy (kg/m$^2$) | Area (m$^2$/7.5 kg) |
|---|---|---|---|---|---|
| | w | h | | | |
| Example 1 | 2.5 | 4.7 | 34 times | 4.4 | 1.71 |
| Comparative Example 1 | Φ2.5 | | 34 times | 2.9 | 2.59 |

In Example 1, a product of foamed strand with the form shown in FIG. 3 that has a ratio of height size to width size of h/w=1.88 was obtained, and in Comparative Example 1 a cylinder of diameter 2.5 was obtained. Both of the products had the same foaming magnification. In Example 1 a foamed net 1 having buoyancy with 1.52 times as much as in Comparative Example 1 was obtained. In order to acquire a buoyancy of 7.5 kg per life vest (a buoyancy standard of a life vest), in Example 1 only 66% of area of the product in Comparative Example 1 was required. At the same time the predetermined buoyancy was obtained without lamination processing, In any clothing material according to one form of the present invention, cross section forms of foamed strands in foamed nets contained as the main material are set so that the height in a direction orthogonal or almost orthogonal to a face of the net is larger than the width. An improvement in warmth retaining property (heat insulating property), buoyancy, flexibility, and cushioning property is attained, without spoiling productivity and with little or no increase in cost and weight using the above-mentioned methods. Clothing materials especially suitable for a life jacket in which buoyancy and compact volume is required, and for sportswear in which outstanding warmth retaining property is required are provided.

In a clothing material according to claim 2, outstanding buoyancy and warmth retaining property are obtained. And in a textile according to claim 3, a lining cloth side (skin side) with a good feeling is given, and as a result a material suitable for clothes with excellent feeling of wearing is obtained. In a textile according to claim 4, the possibility of buckling of a foamed net by an external force is almost overcome, the tendency of the garment getting out of shape is decreased, and improved buoyancy, warmth retaining property, flexibility, and cushioning property are effectively achieved.

What is claimed is:

1. A clothing material comprising:

a foamed net, in a meshed shape and having two faces, disposed between two outer clothing layers;

said net being constructed of an intersection of two strand arrays each comprising a plurality of foamed strands welded together at intersection points;

the cross-section of the strand cut by a plane perpendicular to the strand length having a height dimension that is oriented between 45° and 90° to a said face of the net, said cross-section further having a width dimension;

said height dimension being greater than said width dimension.

2. The clothing material of claim 1 wherein the strands forming at least of one of said arrays have their said cross-section in a generally elliptical shape.

3. The clothing material of claim 1 wherein: said strand height dimension is perpendicular to said face and said strand width dimension is parallel to said face, and the ratio of said strand height dimension of at least one of said arrays to said strand width dimension of said one array is between 1.1 and 4.0.

4. The clothing material of claim 1 wherein the strands forming at least one of said arrays has its said cross-section formed as the character "T" and having a leg of the "T" welded to a strand of the other array.

5. The clothing material of claim 4 wherein: said strand height dimension is perpendicular to said face and said strand width dimension is parallel to said face, and the ratio of said strand height dimension of at least one of said arrays to said strand width dimension of said one array is between 1.1 and 4.0.

6. The clothing material of claim 1 wherein: said stand height dimension is perpendicular to said face and said strand width dimension is parallel to said face, and the ratio of said strand height dimension of at least one of said arrays to said strand width dimension of said one array is between 1.1 and 4.0.

* * * * *